(No Model.)

J. W. ALLEN.
COOKING STOVE.

No. 286,248. Patented Oct. 9, 1883.

WITNESSES:
H. P. Hood.
E. E. Bickler.

INVENTOR:
James W. Allen

UNITED STATES PATENT OFFICE.

JAMES W. ALLEN, OF WEST NEWTON, INDIANA.

COOKING-STOVE.

SPECIFICATION forming part of Letters Patent No. 286,248, dated October 9, 1883.

Application filed May 17, 1883. (No model.)

*To all whom it may concern:*

Be it known that I, JAMES W. ALLEN, a citizen of the United States, residing at West Newton, in the county of Marion and State of Indiana, have invented a new and useful Improvement in Cooking-Stoves, of which the following is a specification.

My improvement relates to an improved construction in cooking-stoves.

The object of my improvement is to apply to the best advantage the heat produced in the fire-box to the purposes of boiling and baking.

The accompanying drawings illustrate my invention.

Figure 2:
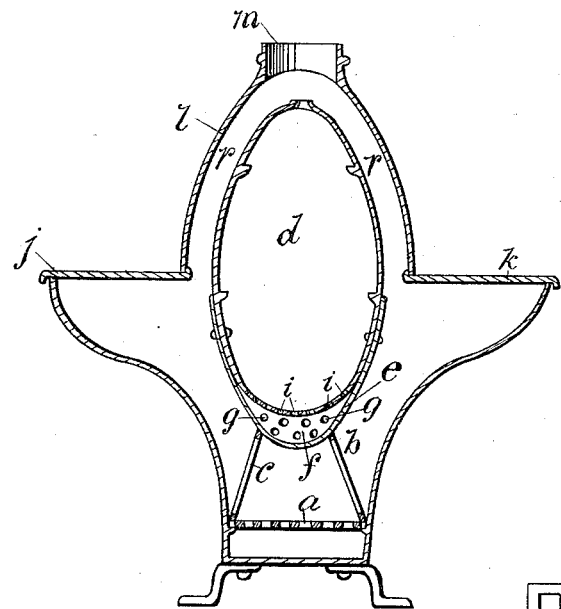
Figure 3:
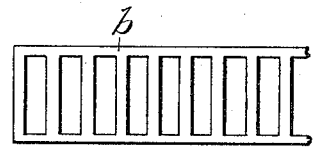
Figure 1:
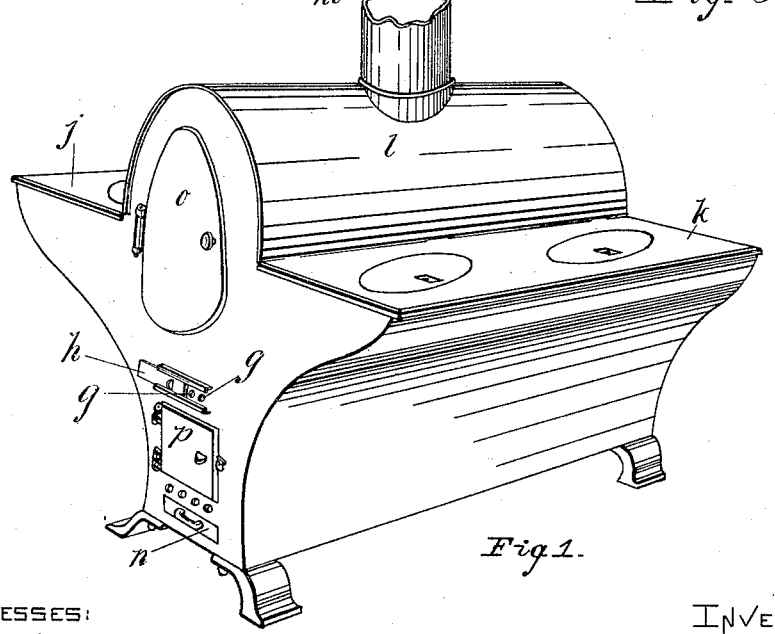

Figure 1 is a perspective view of the complete stove. Fig. 2 is a vertical transverse section. Fig. 3 is a partial elevation of one side of the fire-box.

The fire-box is formed of three grates, $a$, $b$, and $c$, $b$ and $c$ being inclined toward each other at the top, and supporting a casing, $e$, which forms the top of the box. The oven $d$ is preferably made oval in shape, or in such other shape that the sides will be inclined, so that soot and ashes will not readily rest thereon. Said oven is placed directly over the fire-box, being separated therefrom by casing $e$, which extends upward along the sides of the oven, as shown, and forms an air-space, $f$, between said casing and the bottom of the oven. Said air-space communicates with the exterior through openings $g$ $g$ in the front of the stove, which openings are covered more or less by a slide, $h$, and also communicates with the interior of the oven through perforations $i$ $i$ in the bottom thereof. The sides of stove are contracted at the bottom to the width of the fire-box, but separate widely at about one-half the height of the oven to receive the horizontal top plates, $j$ $k$, which are provided with suitable openings to receive kettles and other cooking-vessels in ordinary use. An arched top, $l$, covers the oven above plates $j$ and $k$, a narrow space, $r$ $r$, being left the entire length of the oven on each side, between the oven and the said arched top. A pipe, $m$, for the escape of the products of combustion, is attached to the center of top $l$. A suitable ash-pan, $n$, receives the ashes from the fire-box. Access to the oven is had through door $o$, and fuel is supplied to the fire-box through door $p$.

In cooking-stoves as heretofore usually constructed the fire-box is placed at one side of the oven and the openings for kettles in the top of the fire-box, and the fire and smoke are conducted over the flat horizontal top of the oven, down vertical flues, and across the bottom of the oven in horizontal flues, the result being that the heat is more or less indirectly applied to the oven, and thick deposits of fine ashes are soon formed along said horizontal flues, causing a considerable loss of heat. A strong draft being necessary to carry the heat round the oven in the manner above described, the heat is drawn away from kettles placed in the top openings. In my improved stove these difficulties are avoided, the heat and smoke pass through the grated sides of the fire-box, around the lower part of the oven, and directly upward against the top plates, $j$ and $k$, and against the bottoms of vessels placed in the openings therein. They then pass onward and upward around the upper part of the oven in the space between the oven and arched top $l$. The heat is thus applied directly where needed, and a sufficient amount is obtained from a small amount of fuel. Any ashes which may settle on the top and sides of the oven are dislodged by a slight jar and fall into the ash-pan. When the oven is overheated the temperature may be reduced by opening slide $h$, admitting cooler air to the oven.

I claim as my invention—

1. The above-described stove, consisting of a fire-box having grated sides, as shown and described, an oven mounted thereon, an air-space between said fire-box and oven, an outer casing having flaring sides, top plates, $j$ and $k$, and arched top $l$, all combined substantially as shown and described.

2. In a stove, a fire-box consisting of grates $a$, $b$, and $c$ and casing $e$, supporting the oven, all combined with each other substantially in the manner specified.

JAMES W. ALLEN.

Witnesses:
H. P. HOOD,
E. E. SICKLER.